United States Patent

Geiger

(10) Patent No.: US 8,028,962 B2
(45) Date of Patent: Oct. 4, 2011

(54) FIR TREE MOUNT FOR CABLE TIES

(75) Inventor: Gerard G. Geiger, Jackson, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 831 days.

(21) Appl. No.: 10/835,864

(22) Filed: Apr. 30, 2004

(65) Prior Publication Data
US 2005/0242247 A1 Nov. 3, 2005

(51) Int. Cl.
*F16L 3/08* (2006.01)
(52) U.S. Cl. ........... 248/74.3; 248/71; 248/65; 411/510; 174/656
(58) Field of Classification Search ........ 248/74.3, 248/71, 74.5, 74.4, 65, 231.9, 224.8; 411/510, 411/400; 174/656
See application file for complete search history.

(56) References Cited

U.S. PATENT DOCUMENTS

| | | | |
|---|---|---|---|
| 1,313,372 A | 8/1919 | Dodge | |
| 1,437,144 A | 11/1922 | Isaacson | |
| 2,193,291 A | 3/1940 | Marchins | |
| 2,945,713 A | 7/1960 | Sears | |
| 3,149,808 A * | 9/1964 | Weckesser | 248/74.3 |
| 3,250,505 A | 5/1966 | Rodman, Sr. et al. | |
| 3,486,725 A | 12/1969 | Hidassy | |
| 3,504,937 A | 4/1970 | Panovic | |
| 3,632,069 A | 1/1972 | Thayer et al. | |
| 3,632,070 A | 1/1972 | Thayer et al. | |
| 3,632,071 A | 1/1972 | Cameron et al. | |
| 3,705,708 A | 12/1972 | Cunningham | |
| 3,913,876 A | 10/1975 | McSherry | |
| 4,037,978 A | 7/1977 | Connelly | |
| 4,128,220 A | 12/1978 | McNeel | |
| 4,141,116 A | 2/1979 | Zalonis | |
| 4,396,329 A * | 8/1983 | Wollar | 411/508 |
| 4,552,481 A | 11/1985 | Bluett | |
| 4,665,588 A * | 5/1987 | Nakano | 24/16 PB |
| 4,688,961 A | 8/1987 | Shioda et al. | |
| 4,705,245 A * | 11/1987 | Osada | 248/74.3 |
| 4,768,741 A | 9/1988 | Logsdon | |
| 4,865,281 A * | 9/1989 | Wollar | 248/71 |
| 4,925,136 A | 5/1990 | Knott | |
| 4,936,530 A * | 6/1990 | Wollar | 248/71 |
| 4,955,749 A | 9/1990 | Panovic | |
| 5,224,244 A * | 7/1993 | Ikeda et al. | 24/16 PB |

(Continued)

FOREIGN PATENT DOCUMENTS

GB 933929 8/1963

(Continued)

*Primary Examiner* — Kimberly Wood
(74) *Attorney, Agent, or Firm* — Ryan Kromholz & Manion, S.C.

(57) ABSTRACT

The disclosed device provides an improved mounting assembly for securely supporting elongated items against a surface. The assembly provides a mount with an aperture, which interacts with a flexible tie for retaining the items. The aperture contains a tab, which provides frictional force for the flexible tie when it is placed through the aperture in a preassembled state. The device may also include a diaphragm and a mounting stud extending downwardly from the mount. The diaphragm will provide tension and resistance when the mounting stud is inserted into a supporting surface. The stud may also contain staggered or asymmetrical branches that extend from either side of a center section of the stud. Furthermore, the stud may include a pilot branch located at the end of the stud that will be inserted into the supporting surface. The stud may have a spine and rib that assist in securing the device within a surface.

4 Claims, 9 Drawing Sheets

U.S. PATENT DOCUMENTS

| | | | |
|---|---|---|---|
| 5,328,290 A | 7/1994 | Plastina | |
| 5,332,179 A | 7/1994 | Kuffel et al. | |
| 5,337,983 A | 8/1994 | Mailey | |
| 5,386,615 A | 2/1995 | Bernard | |
| 5,538,208 A | 7/1996 | Cordes et al. | |
| 5,636,937 A * | 6/1997 | Zemlicka | 403/388 |
| 5,653,409 A | 8/1997 | White, Jr. et al. | |
| 5,730,399 A | 3/1998 | Baginski | |
| 5,820,048 A | 10/1998 | Shereyk et al. | |
| 5,820,083 A | 10/1998 | Geiger | |
| 5,862,927 A | 1/1999 | Tebeau | |
| 5,884,367 A | 3/1999 | Teagno et al. | |
| 5,966,781 A | 10/1999 | Geiger | |
| 6,196,751 B1 | 3/2001 | Khokhar | |
| 6,240,602 B1 | 6/2001 | Geiger | |
| 6,398,169 B1 * | 6/2002 | Streit | 248/71 |
| 6,533,226 B2 | 3/2003 | Geiger | |
| 6,536,718 B2 * | 3/2003 | Benito-Navazo | 248/71 |
| 6,718,597 B2 | 4/2004 | Geiger | |
| 7,055,783 B2 | 6/2006 | Rosemann et al. | |
| 2002/0109050 A1 * | 8/2002 | Winton, III | 248/74.3 |
| 2003/0189140 A1 * | 10/2003 | Takeuchi | 248/71 |

FOREIGN PATENT DOCUMENTS

| | | |
|---|---|---|
| GB | 2129863 | 5/1984 |

* cited by examiner

FIR TREE MOUNT FOR CABLE TIES

BACKGROUND OF THE INVENTION

This invention relates generally to hardware for securing bundled elongate articles, such as wires, cables, hoses, tubing, fiber optics, conduits, vines, etc., to a supporting structure. More particularly, the invention relates to a mounting element for securing elongated articles, extending from the hardware and into the supporting structure or its facing surface.

Flexible ties are widely used to secure elongate items, such as wires, cables, hoses and tubes, into compact, secure bundles. Typically, such ties include a head and a flexible strap, which terminates in a tail. In use, the tie is inserted through the head or slotted opening of a mount, such as a saddle mount, and then looped around the elongate item. The tail is then pulled tight to pull the strap around the articles, and thereby secure the articles into a compact, neat bundle. A pawl mechanism within the head secures the strap against withdrawal.

In many applications, it is sufficient merely to secure the items into a bundle. Such applications might include, for example, stationary electronic equipment that remains in one place and is subject to little or no vibration in use. In other applications, it is necessary or desirable not only to secure the items into a bundle, but to secure the resulting bundle to a supporting chassis or framework as well. Such applications are also common, for example, in cars, trucks, airplanes, ships, boats and other vehicles where the bundle is likely to be subjected to severe jostling and vibration. In other applications (e.g. buildings), where vibration might not be an important consideration, it is still desirable to secure cables, hoses, tubes, etc., to a fixed structure.

Generally, the strap and the mount will be manufactured as separate items. However, since the strap and mount are used together, it is advantageous that the items be located near each other before being used for bundling an object or objects. Preferably, the items would be loosely joined together in some fashion.

Likewise, many mounts do not provide an efficient, tight grip when applied to a support surface. Previous Christmas tree or fir tree mounts, such as U.S. Pat. No. 5,921,510, issued to Benoit et al., contemplates strengthened mounting studs, but still leave room for improvement. Such mounts may not provide sufficient resistance and tightness against the support surface for adequately supporting a bundled item. Likewise, such mounts may utilize a longer than necessary mounting stud and may not be easily inserted into the support surface. The present invention provides for an improved mounting assembly to address these problems.

SUMMARY OF THE INVENTION

The present invention provides an improved mounting assembly for securely supporting bundled items against a supporting surface. The assembly provides a mount with an aperture, which interacts with a flexible tie for bundling the items. The aperture contains a tab, which provides frictional force for the flexible tie when the tie is inserted in the aperture in a preassembled state. The surface of the mount preferably has a center beam with two rails, laterally and perpendicular extending from the center beam, forming an H-shaped profile.

The invention may also include a diaphragm spring and a mounting stud extending downwardly from the mount. The diaphragm spring will provide tension and resistance when the mounting stud is inserted into the supporting surface. Branches extend from either side of a center section of the stud. The branches on one side of the stud may be staggered or asymmetrical from the branches located on the other side of the stud. Furthermore, the stud may include aligning means in the form of a pilot branch located at the end of the stud that will be inserted into the surface, or possibly a chamfered rib located centrally on the mounting stud. A mounting assembly according to the present invention may include any combination of the above features.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
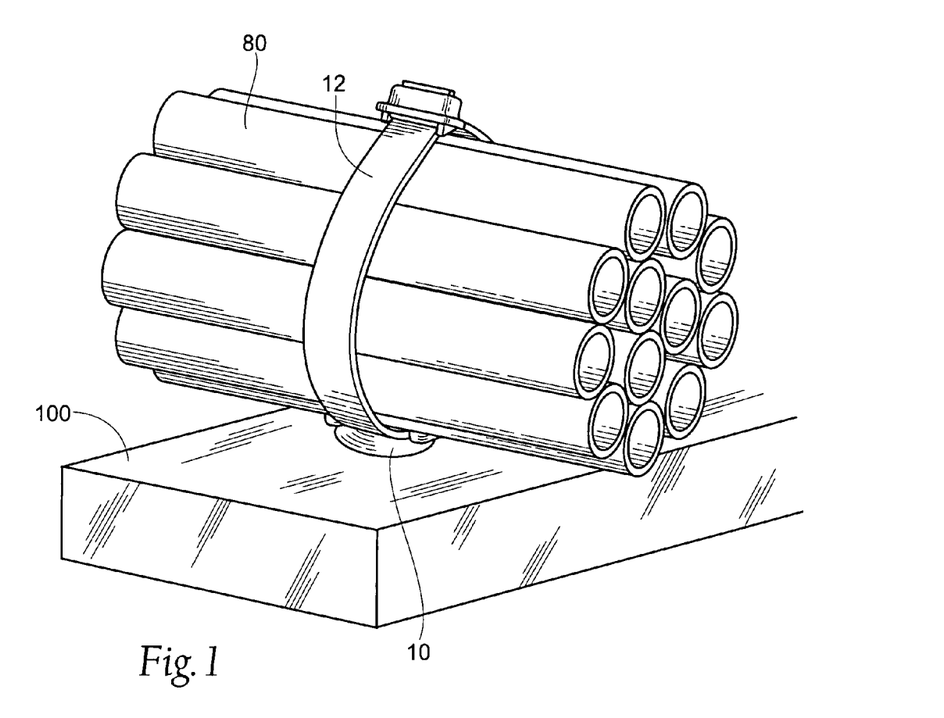
FIG. 1 is a perspective view of a mounting device designed in accordance with the present invention securing a bundled object.

FIG. 1 shows a mounting device 10 according to the present invention securing an elongated object or bundle 80 to a support surface 100. An elongated tie 12 is inserted into the mounting device 10 and is then wrapped and secured around the bundle 80, thereby securing the bundle 80 to the mounting device 10, which is secured to the support surface 100. The bundle 80 may consist of a single object or several objects, such as wires, cables, hoses, tubing, or other elongated articles. It will be apparent that the bundle 80 may comprise a bundle of individual wires or cables, rigid or flexible conduit, hot or cold fluid transporting tubes, or hoses. The bundle 80 may also be contained within the bore of a conventional tubular conduit. Likewise, the bundle 80 may be of various sizes and yet be accommodated by the device 10.

Figure 2:
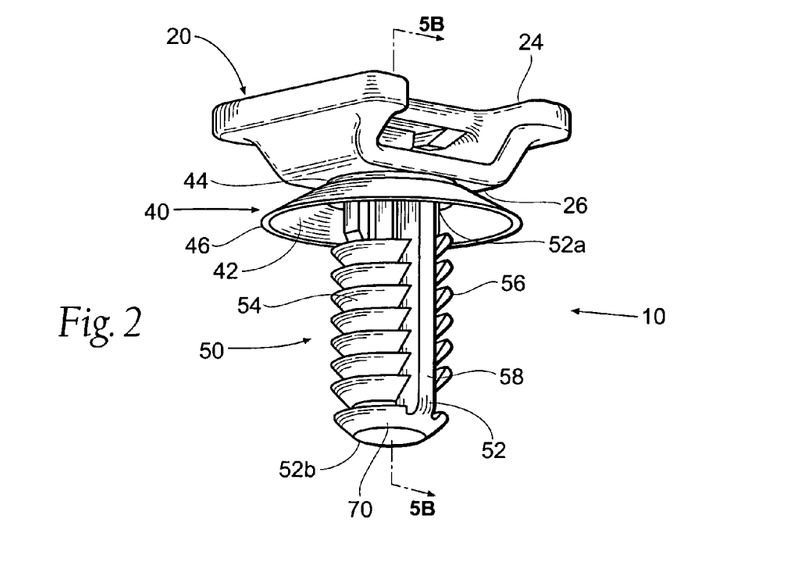
FIG. 2 is a perspective view of a mounting device designed in accordance with the present invention.
Figure 3:
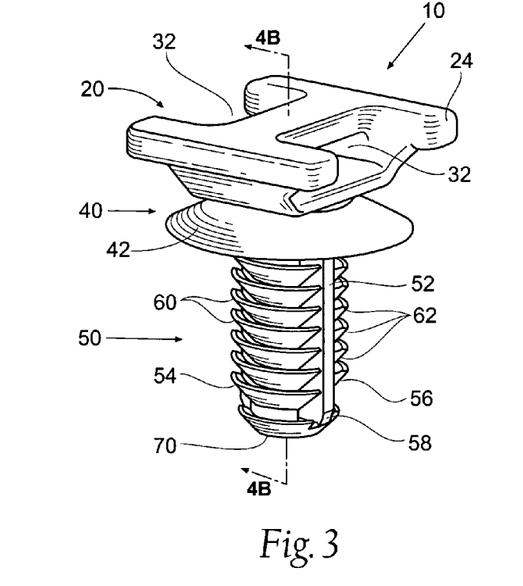
FIG. 3 is an overhead perspective view of a mounting device designed in accordance with the present invention.

FIGS. 2 and 3 show perspective views of the mounting device 10. The mounting device 10 comprises an object support or a mount 20, a spring section 40 located below the mount 20, and a mounting section 50 extending downwardly from the mount 20 and the spring section 40. Each of these sections will be describe in more detail with respect to the following Figures.

The mount 20 comprises a top support surface 24 and a bottom surface 26. The preferred embodiment of the object support or mount 20 as shown and described is sometimes referred to as a saddle mount, which has an H-shaped profile, as viewed in FIG. 3. The top surface 24 provides support for the bundled bundle 80 and the bottom surface 26 provides an area for the spring section 40 and the mounting section 50 to extend from. It should be understood that the top surface 24 and the bottom surface 26 should not be limited to any specific orientations. If the mounting device 10 were mounted so that it hung downwardly from the support surface 100, the bottom surface 26 would be the surface nearest to the support surface 100, even though the bottom surface 26 would be orientated spatially above the top surface 24. Similarly, the top surface 24 constitutes the surface that supports the bundle 80 and does not have to be spatially orientated above the bottom surface 26.

Still referring to FIGS. 2 and 3, the spring section 40 is generally comprised of a flexible disk or diaphragm spring 42. The diaphragm spring 42 extends downwardly from the bottom surface 26 of the mount 20. The diaphragm spring 42 tapers downwardly and outwardly from a first end 44 located at the bottom surface 26 to a second end 46. The diaphragm spring 42 is shown as being circular or conical. However, the shape and structure may be of any arrangement that will provide the necessary resistance for the spring section. For instance, the diaphragm spring 42 may consist of a pyramidal shape of any number of sides, which may or may not have each of the sides connected to an adjoining side.

Referring further to FIGS. 2 and 3, the mounting section 50 is comprised primarily of a mounting stud 52, having a proximal end 52a located at the bottom surface 26 of the object support 20, and a distal end 52b located opposite the proximal end 52a. The mounting stud 52 extends downwardly from the bottom surface 26 of the mount 20. The mounting stud 52 also may be considered to extend downwardly from the spring section 40. However, the spring section 40 may be arranged so that it surrounds the proximal end 52a of the mounting stud 52 and the stud 52 does not actually depend from the spring section 40 or the diaphragm spring 42. Either arrangement should not be considered limiting on the invention and both would fall within the scope of the invention. The mounting stud 52 has three sections: a first section 54, a second section 56, and a center section 58 located intermediate of the first section 54 and the second section 56. The three sections are substantially coextensive with the lengthwise dimension of the mounting stud 52.

Figure 4A:
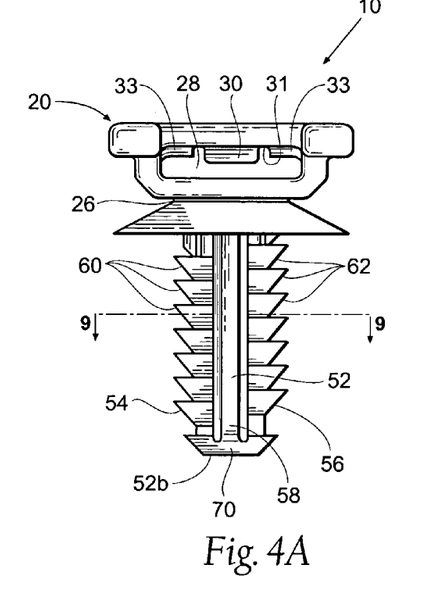
FIG. 4A is a side view of a mounting device designed in accordance with the present invention interacting with a tie strap.
Figure 4B:
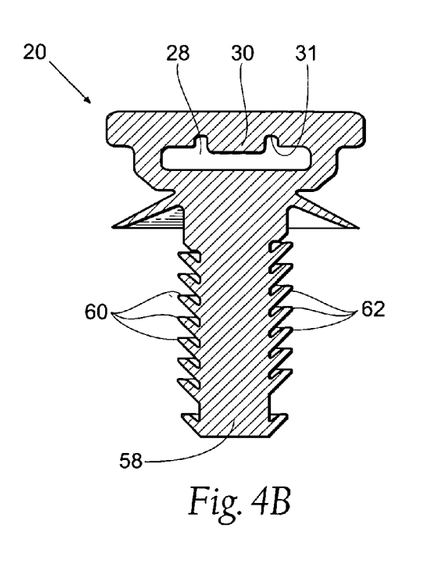
FIG. 4B is a sectional view of a mounting device designed in accordance with the present invention taken along line 4B-4B of FIG. 3.

FIGS. 4A and 4B show the mounting stud 52 having a plurality of extensions or branches 60 and 62 extending respectively from the first section 54 and the second section 56. Such an arrangement is sometimes referred to generally as a fir tree mounting stud or a Christmas tree mounting stud. The branches 60 and 62 extend outwardly from the center section 58. The branches 60 and 62 are longitudinally spaced from one another and are tapered upwardly towards the bottom surface 26. Preferably, the branches 60 and 62 are evenly spaced between one another. As shown, the branches 60 are not symmetrically aligned with the branches 62, and preferably, the branches 62 are arranged so that they would lie in a parallel plane extending halfway between the parallel planes formed by two corresponding branches 60.

The staggered arrangement of the branches 60 and 62 allows for a stronger and a more easily insertable mounting device 10 than in previous designs with symmetrical designs. As the stud 52 is inserted into the supporting surface 100, only one of the branches 60 or 62 will make contact with the support surface 100, thereby easing insertion of the stud 52. The staggered branches 60 and 62 have more opportunities to grab and retain the supporting surface 100 than in previous mounts of similar sizes. The staggering of the branches 60 and 62 allows retention that would not be possible in a normally arranged stud. Because the branches 60 and 62 are not symmetrical, the force to pull the stud 52 from the support surface 100 is increased. The branches engage the support surface 100 at differing angles from one another when being pulled out, which increases the necessary pullout force and provides for a more secured stud 52, since the branches 60 and 62 reduce the pitch of the branches to half of what would be seen in a symmetrical design. The engagement distance is half of that of a symmetrical design, and there are two engagement stops to every single engagement stop on a symmetrical fir tree mount having an equal length. Essentially, the present mounting stud 10 doubles the ability to form a tight grip in a supporting surface compared to previously designed studs having the same length as the present invention.

Likewise, if the branches 60 and 62 were not staggered and were located on both sides of the mounting 52 while being spaced as presently disclosed, the branches would be situated too close to one another to provide an efficient mounting device. The branches would be too close together to be properly molded, which is a possible method of forming the stud 52. Another design feature of the branches is there shape and size. Preferably the branches are designed having short, stubby branches with as large a center diameter as possible. Such an arrangement contributes to the strength of the stud 52 discussed above. It should be noted that the branches 60 and 62 could also be of different shapes and designs as shown. The branches 60 and 62 could be of a warped shape, wavy, or constructed according to other constructions as necessary. Likewise, the stud 52 could be oval or another shape depending on the shape of the hole for the stud 52 to enter.

Still referring to FIGS. 4A and 4B, the support 20 further comprises an aperture 28 having a tab 30 extending from a lower side 31 of the mount 20 into the aperture 28. The tab 30 engages the elongated tie 12 when the tie 12 is inserted into the aperture 28, preferably movably engaging with a plurality of serrations 14 located on the tie 12 (see FIGS. 6 and 7). As will be shown in FIGS. 6 and 7, the tab 30 provides resistance and friction for the elongated tie 12 when it is preassembled with the mounting device 10.

Figure 5A:
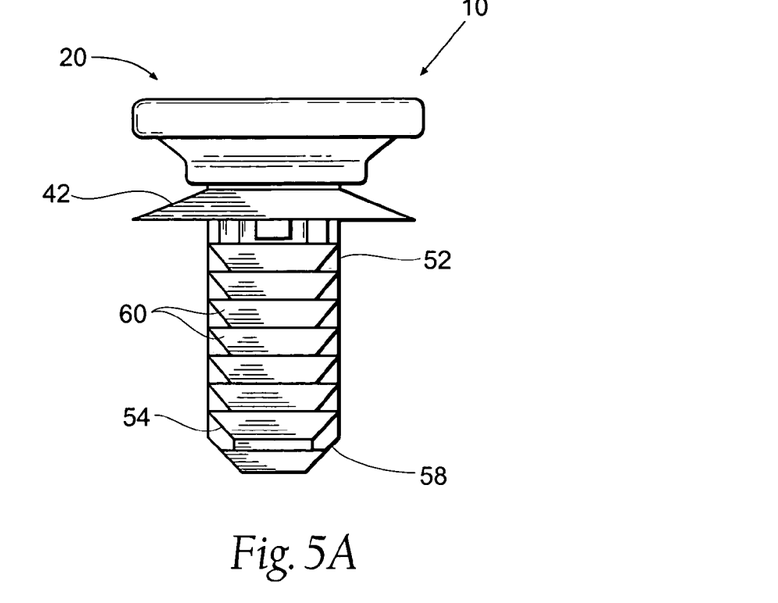
FIG. 5A is side view of a mounting device designed in accordance with the present invention rotated 90° from the view of FIG. 4A.

FIG. 5A shows a side view of the mounting device 10, rotated 90° from the view shown in FIG. 4A. The width of the center section 58 is preferably as wide as the width of the first section 54 and the branches 60. It should be understood that the dimensions of the second section 56 are preferably the same as that of the first section 54. The wide diameter of the center section 58 allow for the branches 60 (and also the branches 62) to be formed shorter and thicker than previous designs, which provides for a more secure mounting device 10.

Figure 5B:
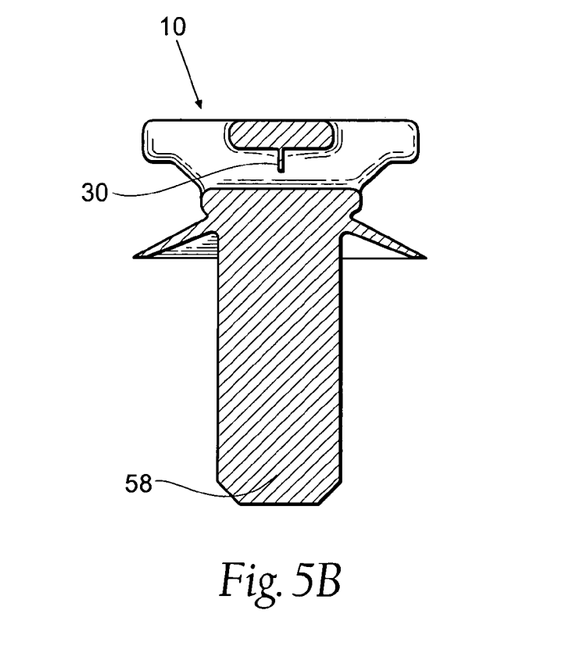
FIG. 5B is a sectional view of a mounting device designed in accordance with the present invention taken along line 5B-5B of FIG. 2.

FIG. 5B shows a sectional view of the mounting device 10. As previously stated, a molding process may form the mounting device 10. The present arrangement allows for the friction tab 30 to be molded so that it is strong enough to resist movement of the tie 12 when it is inserted into the aperture 28 (see FIGS. 6 and 7), while being flexible enough to bend when the tie 12 is securing a bundle.

Figure 6:
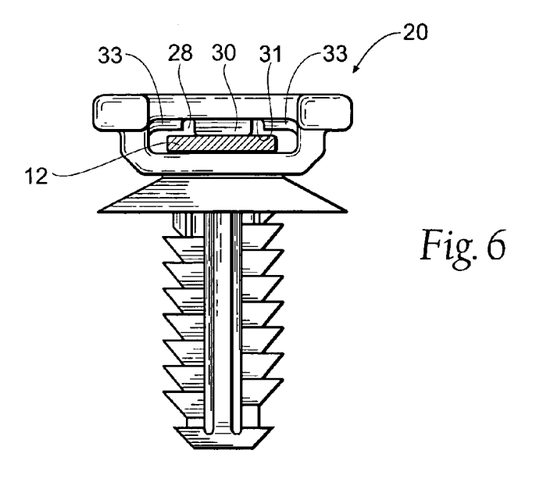
FIG. 6 is a side view of a mounting device designed in accordance with the present invention interacting with a tie strap.
Figure 7:
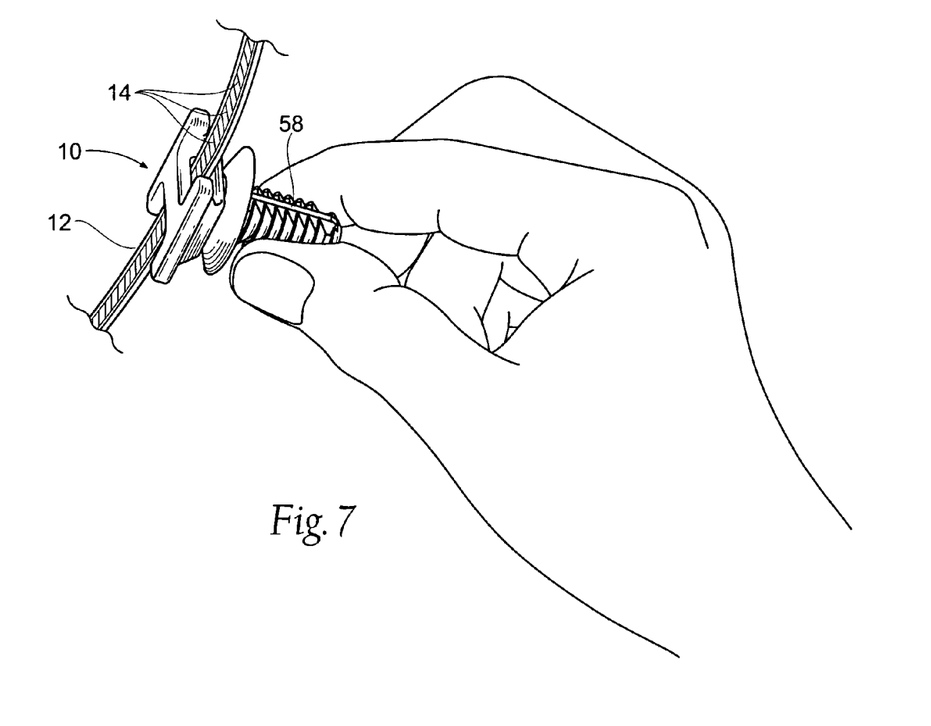
FIG. 7 is a perspective view of a mounting device designed in accordance with the present invention being grasped by a person.

FIGS. 6 and 7 show the mounting device 10 interacting with the elongated tie 12 prior to the elongated tie 12 being secured around the bundled bundle 80 (as shown in FIG. 1). The tie 12 is inserted through the aperture 28 and may be moved forward and backward as necessary. The tab 30 provides resistance for the tie 12 sufficient enough so that the tie will be retained under normal forces that may be encountered when moving or grabbing the mounting device 10. Thus, the tie 12 and the mounting device 10 may be preassembled so that they are loosely connected, as shown, and moved or placed in a container containing several mounting devices and ties without concern that the tie 12 and device 10 will separate. The tab 30 holds the tie 12 in a ready position so that the tie 12 is in proper orientation to allow immediate cinching or wrapping of a bundle.

As shown particularly in FIG. 7, the tie 12 will be retained within the aperture 28 even if the tie is held at an angle normal to the ground. Preferably, the friction tab 30 will interact with one of the serrations 14 to provide the necessary friction to retain the tie in place. The tab 30 will hold the tie 12 in place, but also allows the tie 12 to be moved by hand when necessary. Likewise, the tab 30 is advantageous over designs that may have a smaller aperture because the present design provides for an easier process for feeding the tie 12 into the aperture, since the frictional force when feeding the tie 12 will be less in the present invention. Also, the tab 30 is flexible enough so that it will not bind up the tie 12 within the aperture 28 when pressure is applied to the tie 12.

Referring to FIG. 7, the present invention also provides other advantages over prior designs. The present invention can free up a user's hand, since a person will not need to look for the separate pieces and assemble the pieces. Time and effort will be reduced because the mounting device 10 and the tie 12 can be shipped preassembled. Also, the center section 58 is shown to run in the same direction as the tie strap 12. A person can grab a mounting device 10 by the stud 52 and know the proper orientation of the device 10 simply by feeling the stud and the position of the center section 58. This can be performed without needing to visually confirm the orientation of the device 10, which will increase time and efficiency when mounting a bundle or inserting and orientating the mounting device 10 into a support surface.

FIGS. 4A and 6 also show a pair of shoulders 33 extending downwardly from the lower side 31 of the mount 20 into the aperture 28. The shoulders 33 are preferably located on either side of the tab 30. When the bundle 80 is secured (see FIGS. 1 and 9-11), the tie 12 will be pulled so that the tab 30 flexes and the bundle 80 may be tightened. The shoulders 33 provide a solid resistance that the tie 12 will abut, thereby firmly securing the bundle 80. The tab 30 will flex sufficiently enough to not interfere with tie 12 abutting the shoulders 33. Moreover, the shoulders 33 create a recessed channel for the friction tab 30, thereby allowing the friction tab 30 to have proper dimensions that will allow the tab 30 flex during tie 12 insertion and being rigid enough to hold the tie strap 12 in place when insertion has happened. The arrangement and number of shoulders 33 and the tab 30 may differ from that shown in the drawings.

Figure 8:
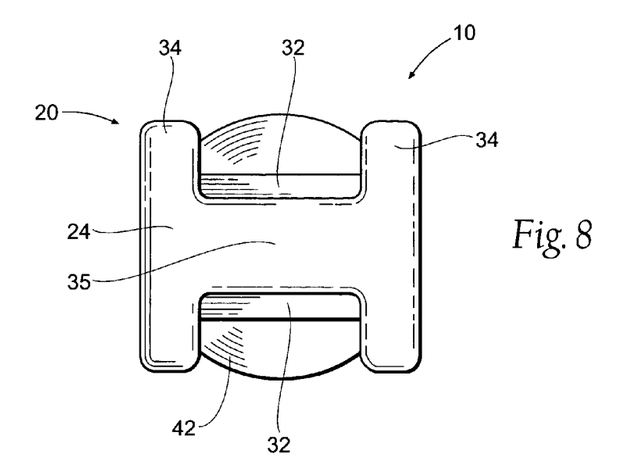
FIG. 8 is an overhead view of a mounting device designed in accordance with the present invention.

FIG. 8 provides an overhead view of the mounting device 10 and the supporting section 20. As previously stated, the supporting section is preferably of an H-shaped configuration, with two rails 34 laterally extending perpendicular to a center beam 35. The top surface 24 is provided with at least one cut-away portion 32, preferably with two cut-away sections 32, as shown. FIG. 8 depicts the supporting section 20 as having two cut-away portions. The cut-away portion 32 of the top surface 24 allows bundles 80 (not seen in this view) having small diameters to be better circumferentially wrapped with the flexible tie 12 and be effectively secured to the top surface 24 (see FIG. 13). The tie 12 can be drawn into a smaller loop, to accommodate objects having a smaller diameter, if necessary. Furthermore, the rails 34 longitudinally extending from the top surface 24 provide additional support when large objects are secured (see FIG. 15). The rails 34 also spread the load distribution by providing a larger surface for the bundles 80 to contact when being supported, and the rails 34 reduce potential pinching of the load or bundle. While the top surface 24 may be designed in other manners than the above-described "H" shape, the preferred shape allows adequate support for a wide range of object and bundle sizes, and also provides a more secure circumferential wrap for smaller bundles over prior designs.

FIG. 8 also shows an overhead view of the diaphragm spring 42. The diameter of the diaphragm spring 42 is preferably greater than that of the mounting stud 52. Thus, when the mounting stud 52 is inserted into the support surface 100 (see FIGS. 11A, 11B, 12A, and 12B), the diaphragm spring 42 provides a sufficient area so that it may flex against the support surface 100 and provide a tight fitting arrangement for the mounting device 10. Also, the diameter of the diaphragm spring 42 is sufficient so that the mounting stud 52 will not prohibit the diaphragm spring 42 from flexing against the support surface 100. As previously stated, the diaphragm spring 42 is shown as circular, but it should be understood that any flexible geometric design or shape is capable of acting as the diaphragm spring 42.

Figure 9:
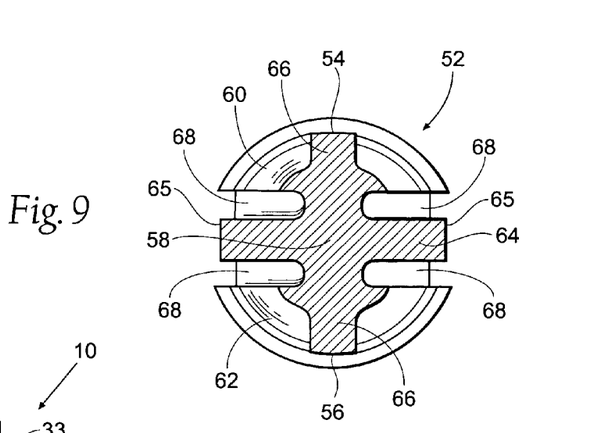
FIG. 9 is a sectional view of a mounting device designed in accordance with the present invention taken along the line 9-9 of FIG. 4A.

FIG. 9 shows a sectional view of the mounting stud 52 taken along line 9-9 of FIG. 4A. The center section 58 has a chamfered spine 64 extending across the center section 58. The spine 64 provides support for the center section 58, and also for the mounting stud 52, in general. As previously discussed with respect to FIG. 5A, the wide diameter of the spine 64 provides more stability for the mounting stud 52 and the branches 60 and 62. As shown, the first section 54 and the second section 56 have similar supporting ribs 66 that provide support for the respective sections 54 and 56. The ribs 66 also provide added reinforcement for the branches 60 and 62. Furthermore, the ribs 66 and the spine 64 assists in keeping the mounting stud 52 centered in the hole 102 (see FIGS. 11B and 12B) and preventing the branches 60 and 62 from wandering within the hole. The result is that the mounting device 10 sits more securely within the support surface 100. The spine 64 is also shown as being separated from the branches 60 and 62 by a plurality of gaps 68 located on both sides of the spine 64. The gaps 68 allow the branches 60 and 62 to flex separately from the center section 58 and from each other.

As FIG. 9 shows, the mounting stud 52 preferably divided evenly by the spine 64 of the center section 58 and divided evenly by the supports 66. Such an arrangement should not be considered limiting on the invention but merely exemplary. For instance, the center section 58 signifies only that the section is intermediary of the first section 54 and the second section 56 and forms a barrier or boundary between the first section 54 and the second section 56, not that it is necessarily aligned directly with the center of the mounting stud 52. Likewise, the branches 60 and 62 should only be viewed as having branches located at different latitudes and not limiting as the number of separate branch sections possible. As an example, the branches 60 and 62 could be designed as separate quarters separated by the first section 54 and the second section 56, which would provide for four level of engagement with the support surface 100, and still fall within scope of the present invention.

Still referring to FIG. 9, the spine 64 has relatively straight outer edges 65. These edges 65 assist the user in properly orientating the mounting device 10, as was previously discussed with respect to FIG. 7. The shape of the spine 64 provides a definite area that a person can rely upon to properly align the mounting stud 52. The spine 64 is also designed to proved a secure fit within the hole 102 so that rotation of the mounting stud 52 within the hole 102 is minimized.

Referring again to FIGS. 2, 3, and 4a, another feature of the mounting section 50 is shown. Aligning means 70 are located at the distal end 52b. The aligning means 70 assist the user in directing the mounting device 10 into the support surface 100. The aligning means 70 may be of any shape that helps direct and normalize the mounting stud 52 with respect to the support surface 100 so that the mounting stud will be properly and efficiently inserted into the support surface 100. The aligning means 70 is preferably structured similarly to the branches 60 and 62, but extending around the entire circumference of the mounting stud 54. Such a structure is commonly called a pilot branch, and the pilot branch 70 preferably has a diameter less than the overall diameter of the branches 60 and 62. However, other structures may be used as the alignment means 70, for instance, the spine 64 referenced above. The pilot branch 70 tapers upwardly towards the bottom surface 26 of the mount 20, with an outer pilot branch angle of approximately 45° employed in a preferred embodiment.

Figure 10:
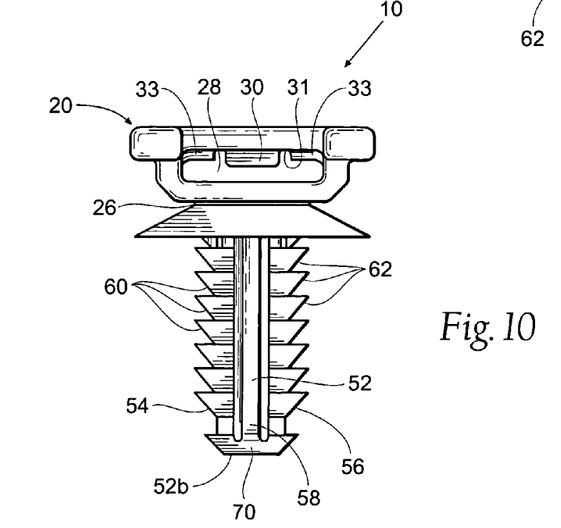
FIG. 10 is a side view of a second embodiment of a mounting device designed in accordance with the present invention.

FIG. 10 shows another embodiment of the mounting device 10. The embodiment is similar to the previous embodiment, except that the branches 60 and 62 are no longer staggered or asymmetrical. The embodiment shows that the friction tab 30, the diaphragm spring 42, the pilot branch 70, and the center section 58 are still capable of functioning without the branches 60 and 62 arranged in a staggered fashion. Likewise, any of the above mentioned elements could be separately used in a mounting device.

Figure 11A:
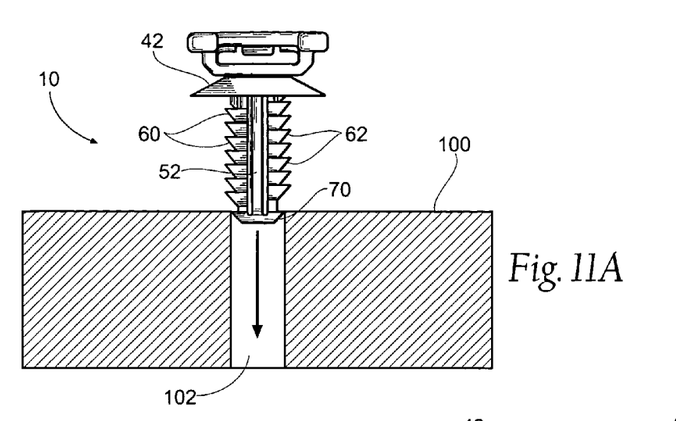
FIG. 11A shows a mounting device designed in accordance with the present invention being inserted into a support surface.
Figure 11B:
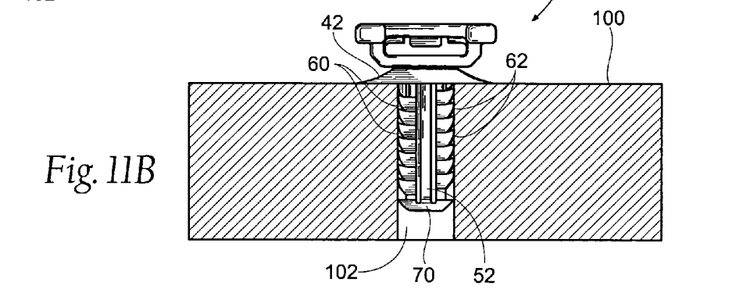
FIG. 11B shows the mounting device in FIG. 11A after insertion into a support surface.
Figure 12A:
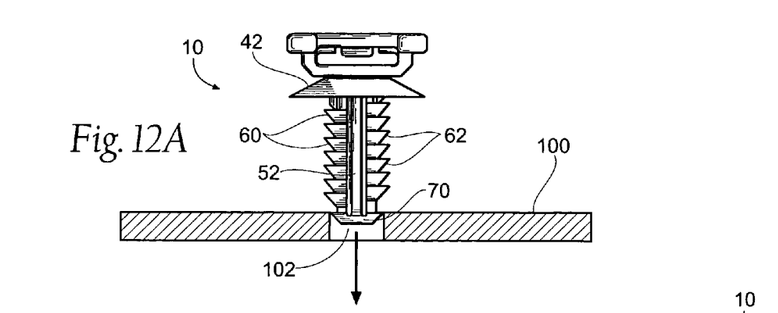
FIG. 12A shows a mounting device designed in accordance with the present invention being inserted into a support surface.
Figure 12B:
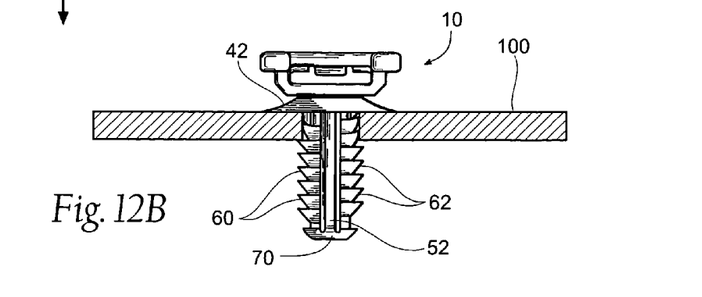
FIG. 12B shows the mounting device in FIG. 11A after insertion into a support surface.

FIGS. 11A, 11B, 11A, and 11B show the mounting device 10 being inserted into the support surface 100. FIG. 11A is essentially the same as FIG. 12A, and FIG. 11B is essentially the same as FIG. 12B, except that FIGS. 11A and 11B show a thicker support surface 100, and FIGS. 12A and 12B show a thinner support surface 100. The present invention has an advantage over previous designs in that it is well suited to from a tight grip in both varying support surface 100 thicknesses, especially because of the design of the ribs 66 and the spine 64.

As previously stated, the pilot branch 70 assists the user in aligning the mounting stud 52 for insertion within the hole 102. Once aligned, the mounting stud 52 can be driven into the hole 102, either by hand or with a hammer of some sort (i.e. a rubber mallet). As the mounting stud 52 enters the hole 102, the branches 60 and 62 engage the sides of the hole 102. The staggered design of the branches 60 and 62 allows more frequent engagement with the sides of the hole 102 than in previous designs, thereby retaining the mounting stud 52 more efficiently. The branches 60 and 62 are shown flexed against the sides of the hole 102. It may also be that the branches 60 and 62 would extend beyond the support surface 100 and retain their normal shape, as shown in FIG. 12. However, in either instance, if the mounting device 10 were to be pulled out of the hole 102, the branches would resist such movement, especially in longer holes 102, as shown in 11B, that have been tapped or located in a masonic surface.

The diaphragm spring 42 is also shown in FIGS. 11A, 11B, 12A, and 12B. FIGS. 11A and 12A show the diaphragm spring 42 in a normal, relaxed position. As the mounting stud 52 moves into the hole 102, the diaphragm spring 42 is flexed against the support surface 100 (see FIGS. 11B and 12B). The resulting arrangement provides for a tighter fit of the mounting stud 52 against the support surface 100 than in previous designs. The diaphragm spring 42, which provides a preload spring tension, adds tightness for the mounting stud 52 against the support surface 100. The mounting stud 52 is retained in the hole 102, however, because of the retaining force of the branches 60 and 62. Even with the arrangement of the branches 60 and 62, there still is a possibility that a gap may be present between the support surface 100 and the mounting device 10. The diaphragm spring 42 fills in the gap in such an instance.

Figure 13:
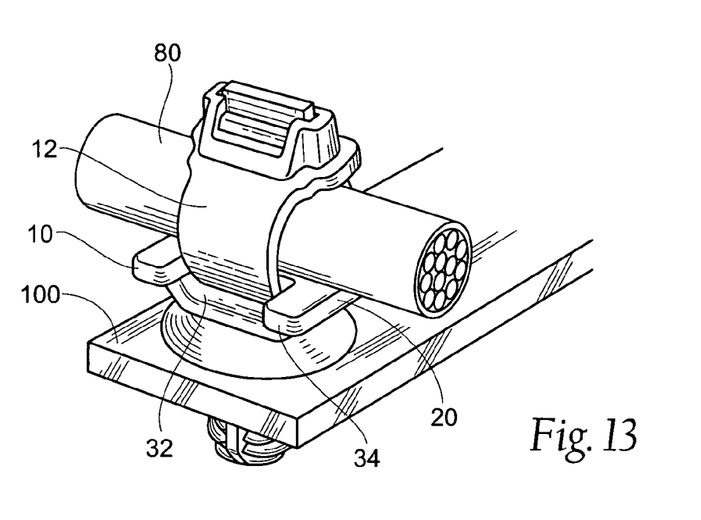
FIGS. 13-15 present perspective views of a mounting device designed in accordance with the present invention bundling objects of varying sizes.
Figure 14:
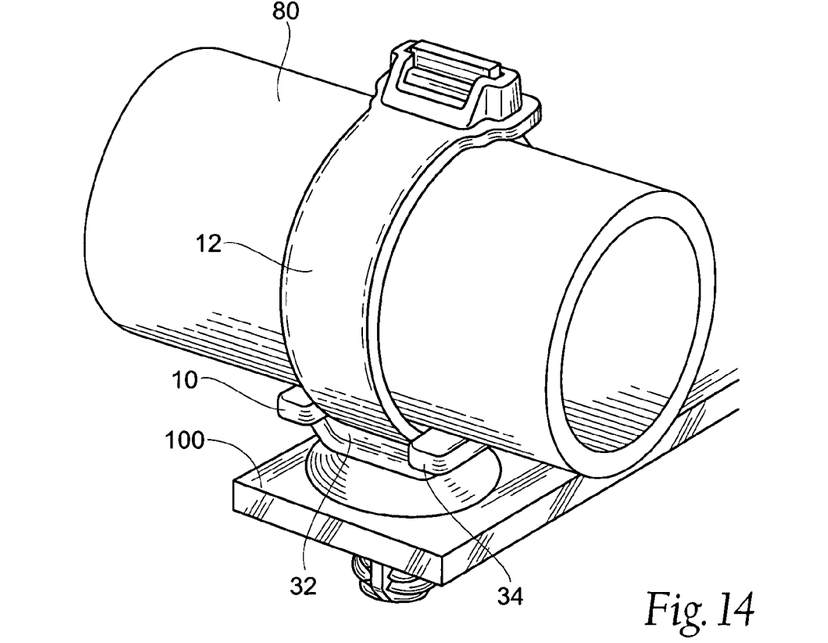
Figure 15:
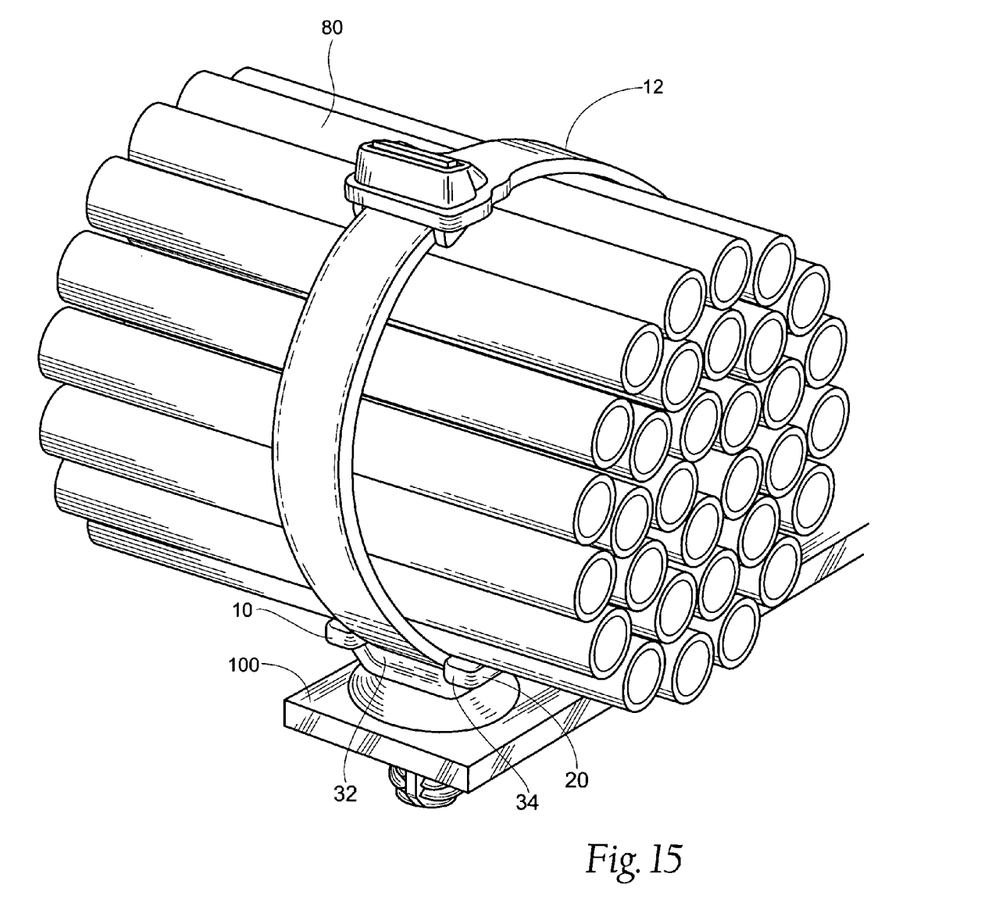
Figure 16:
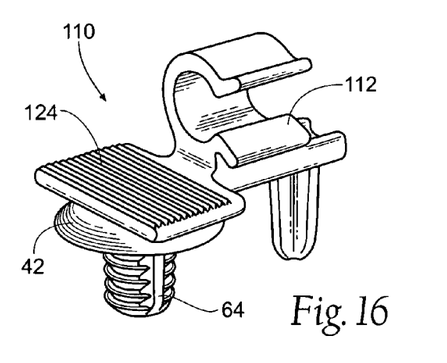
FIGS. 16-20 depict different embodiments a mounting device designed in accordance with the present invention.

FIGS. 13-15 show the ability of the mounting device 10 to support bundles 80 of varying sizes. FIG. 9 shows the mounting device 10 and the elongated tie 12 securing a small individual bundle 80, such as a fiber optic wire. The object support 20 allows for a tight retention of the bundle 80 by allowing the tie 12 to move into the cut-away sections 32. However, as shown in FIGS. 14 and 15, when a larger bundle 80 or a plurality of bundles 80 is secured, the tie 12 will extend outwardly through the cut-away sections 32. The rails 34, which were not completely utilized in FIG. 13, now provide added support for the bundle 80 by providing a larger contact surface, thereby allowing for a more secure design. If desired, the rails 34 may be formed to more closely follow the contour of the bundle 80.

All of the features discussed in the invention may be present in a single mounting device 10, or a mounting device 10 may contain one of the described features and still fall within the scope of the invention. For instance, the pilot branch 70 may also be used on a device that does not have the branch arrangement as discussed above. Similarly, the tab 30 or the diaphragm spring 42 may be used on a wide range of mounting assemblies. Preferably the components for the mounting device 10 are injection molded from a strong, durable plastic, such as Nylon 6/6.

Figure 17:
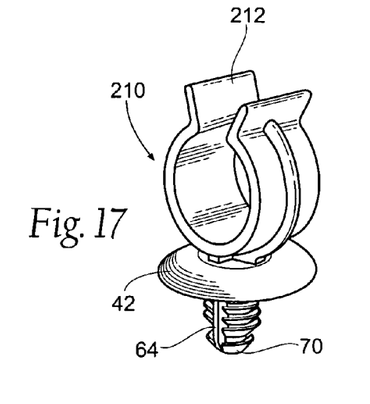
Figure 18:
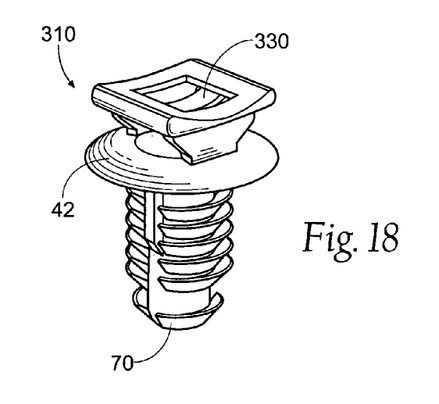
Figure 19:
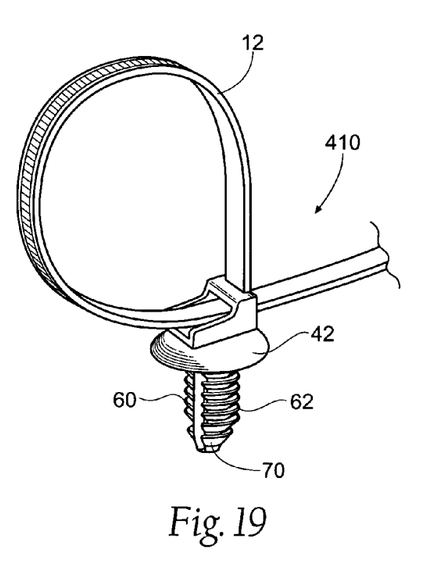
Figure 20:
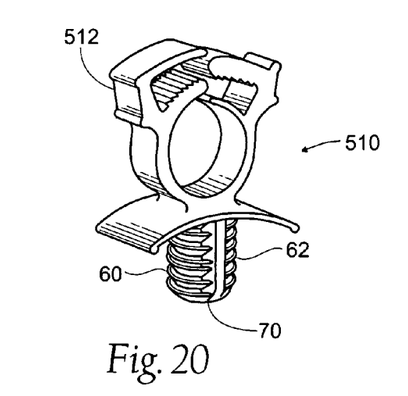

FIGS. 16-19 are examples of the features of the present invention used in other embodiments. A mounting device 110 is shown employing the diaphragm spring 42 and the securing spine 64. A top surface 124 is arranged differently from the previous drawings, and the mounting device 110 will have a wire or cable clipped into a clip 112 located on the mounting device 110, as opposed to the tie 12 used in the previously described embodiments. Similarly, FIG. 17 shows a mounting device 210 designed with the diaphragm spring 42, the aligning means 70, and the securing spine 64, and, also, a clip 212 used in place of the tie 12. A mounting device 330 is depicted in FIG. 18 having the diaphragm spring 42 and the aligning means 70. Another embodiment of a friction tab 330 is also shown. The friction tab 330 provides resistance as for the previously described friction tab 30. FIG. 19 shows a mounting device 410 having an integral tie strap 12. The mounting device 410 utilizes the diaphragm spring 42, the staggered branches 6o and 62, and the aligning means 70. FIG. 20 also shows a mounting device utilizing the diaphragm spring 42, the staggered branches 60 and 62, and the aligning means 70. As evident by these embodiments, the present invention may be used in many varying arrangements. A clip 512 is used in the example of FIG. 20 in place of a tie strap.

The foregoing is considered as illustrative only of the principles of the invention. For instance, the tie 12 should be considered broadly to encompass a structure that will secure an object to the mounting device, such as the clips 112, 212, and 512 shown in FIGS. 16, 17, and 20, respectively. Likewise, the clips 112 and 212, or other similarly contemplated designs, should be understood as incorporated under the previously discussed aperture that the tie 12 interacts with. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A mounting assembly for anchoring an elongate member to a supporting structure, said mounting assembly interacting with an elongated flexible tie for surrounding said bundled elongate member, said tie having an exposed surface including a plurality of adjacent serrations extending lengthwise of said tie, said mounting assembly comprising:
    a support containing an aperture, said aperture allowing insertion and withdrawal of said flexible tie through said aperture, said support including a bottom surface;
    a non-binding friction tab located in said aperture of said support, said friction tab providing resistance to longitudinal movement of said flexible tie when said support and said flexible tie are arranged in a preassembled state, said friction tab being arranged to allow bidirectional longitudinal movement of said flexible tie when an external force is applied to said tie;
    a mounting stud having a distal end and a proximal end, said proximal end of said mounting stud extending from said bottom surface of said support, said distal end being insertable into said supporting structure;
    wherein said support comprises a top surface for supporting said elongate member;
    wherein said top surface further comprises at least one rail extending longitudinally relative to said tie;
    wherein said top surface comprises a pair of parallel, laterally spaced rails extending longitudinally relative to said tie; and
    wherein said top surface is H-shaped with defining, laterally spaced, parallel rails extending longitudinally relative to said tie.

2. The mounting assembly according to claim 1 wherein said mounting stud further comprises:
    a first section, a second section, and a center section intermediate of said first section and said second section, said sections substantially coextensive with the lengthwise dimension of said stud; and
    a plurality of longitudinally spaced branches respectively located on said first and said second section, said branches extending outwardly from said center section and upwardly throughout their length and toward said support, said branches of said first section being asymmetrically arranged with respect to said branches of said second section.

3. The mounting assembly according to claim 2 wherein said mounting stud further comprises means for aligning said stud into said supporting structure, said aligning means located at said distal end of said mounting stud.

4. The mounting assembly according to claim 1 further comprising means for aligning said stud into said supporting structure, said aligning means located at said distal end of said mounting stud.

\* \* \* \* \*